US009706511B2

(12) United States Patent
Bhamri et al.

(10) Patent No.: US 9,706,511 B2
(45) Date of Patent: Jul. 11, 2017

(54) METHOD AND APPARATUS FOR DETECTION OF SYNCHRONIZATION SIGNALS IN WIRELESS NETWORKS

(71) Applicant: Nokia Technologies Oy, Espoo (FI)

(72) Inventors: Ankit Bhamri, Espoo (FI); Zexian Li, Espoo (FI); Lars E. Lindh, Helsingfors (FI); Cássio Ribeiro, Espoo (FI); Panayiotis Papadimitriou, Espoo (FI)

(73) Assignee: Nokia Technologies Oy, Espoo (FI)

( * ) Notice: Subject to any disclaimer, the term of this patent is extended or adjusted under 35 U.S.C. 154(b) by 112 days.

(21) Appl. No.: 14/810,449

(22) Filed: Jul. 27, 2015

(65) Prior Publication Data

US 2016/0309433 A1 Oct. 20, 2016

(30) Foreign Application Priority Data

Apr. 17, 2015 (GR) .............................. 20150100166

(51) Int. Cl.
*H04L 27/06* (2006.01)
*H04W 56/00* (2009.01)
*H04W 76/02* (2009.01)

(52) U.S. Cl.
CPC ....... *H04W 56/002* (2013.01); *H04W 76/023* (2013.01)

(58) Field of Classification Search
CPC ... H04W 4/005; H04W 88/02; H04W 72/048; H04W 92/18; H04W 4/06; H04W 76/043; H04W 28/18; H04W 92/00; H04J 11/0069; H04J 2011/0096; H04J 11/0073; H04J 13/0062; H04J 2211/005

USPC ................... 375/340, 267; 455/502; 370/350
See application file for complete search history.

(56) References Cited

U.S. PATENT DOCUMENTS

| 7,894,417 | B2 | 2/2011 | Parts et al. |
| 8,270,528 | B2 | 9/2012 | Zeng et al. |
| 2004/0005018 | A1 | 1/2004 | Zhu et al. |
| 2012/0307820 | A1* | 12/2012 | Tomatis ............. H04B 1/70755 370/350 |
| 2014/0036779 | A1 | 2/2014 | Yang et al. |
| 2014/0112194 | A1* | 4/2014 | Novlan ................. H04W 8/005 370/254 |
| 2016/0044613 | A1* | 2/2016 | Cai ....................... H04W 56/00 370/315 |

(Continued)

OTHER PUBLICATIONS

Kim et al., "SSS Detection Method for Initial Cell Search in 3gpp LTE FDD/TDD Dual Mode Receiver", 9th International Symposium on Communications and Information Technology, Sep. 28-30, 2009, pp. 199-203.

(Continued)

*Primary Examiner* — Rahel Guarino
(74) *Attorney, Agent, or Firm* — Harrington & Smith (57) ABSTRACT

Various communication systems may benefit from an accurate detection method. The method may include determining correlation values between a first sequence of samples and at least one pre-defined sequence, detecting whether at least one first peak exists by comparing the correlation values with at least one first detection threshold. If the at least one first peak exists, the method may further include performing summing of at least a subset of the correlation values and detecting whether at least one second peak exists by comparing the summed correlation values with a second detection threshold.

19 Claims, 5 Drawing Sheets

(56) References Cited

U.S. PATENT DOCUMENTS

2016/0278136 A1* 9/2016 Sorrentino ........ H04W 56/0025

OTHER PUBLICATIONS

Sesia et al., "Secondary Synchronization Signal Sequences", The UMTS Long Term Evolution from theory to practice, 2011, pp. 158-164.
"3rd Generation Partnership Project; Technical Specification Group Radio Access Network; Evolved Universal Terrestrial Radio Access (E-UTRA); Physical Channels and Modulation(Release 10)", 3GPP TS 36.211, V10.4.0, Dec. 2011, pp. 1-101.
Zhi et al., "A Novel Initial Cell Search Scheme in TD-LTE", IEEE 73rd Vehicular Technology Conference, May 15-18, 2011, 5 pages.
Ghosh et al., "Robust Signal Detection and Timing Synchronization Algorithms for OFDM Based Wireless Systems", Proceedings of the Eleventh National Conference on Communications, 2005, pp. 1-5.

* cited by examiner

METHOD AND APPARATUS FOR DETECTION OF SYNCHRONIZATION SIGNALS IN WIRELESS NETWORKS

TECHNICAL FIELD

The present application relates generally to synchronization, such as, for example, to detection of synchronization signals in wireless networks.

BACKGROUND

Long Term Evolution, LTE, is a wireless communication system developed by the 3$^{rd}$ Generation Partnership Project, 3GPP. In LTE cell detection and initial synchronization are based on two synchronization signals, a Primary Synchronization Signal, PSS, and a Secondary Synchronization Signal, SSS. A single radio frame comprises two PSS/SSS sequences in LTE, and the two PSS/SSS sequences are with a periodicity of 5 ms.

One of the topics in LTE is device-to-device, D2D, communications and 3GPP is finalizing the specifications for certain D2D operations at the moment. In the context of D2D communications a Primary Device-to-Device Synchronization Signal, PD2DSS, corresponds to the PSS while a Secondary Device-to-Device Synchronization Signal, SD2DSS, corresponds to the SSS. Moreover, it has been agreed that there will be two PD2DSSs and two SD2DSSs in a single subframe with a periodicity of 40 ms for D2D communications.

Synchronization signals are also employed in other wireless cellular systems such as Wideband Code Division Multiple Access, WCDMA, and CDMA2000, for example. In addition to different wireless cellular systems, synchronization signals are used in several other wireless systems, such as, Wireless Local Area Network, WLAN, and Worldwide Interoperability for Microwave Access, WiMAX, systems as well.

SUMMARY

According to certain embodiments, an apparatus may comprise at least one processor and at least one memory including computer program code, the at least one memory and the computer program code being configured to, with the at least one processor, cause the apparatus at least to determine correlation values between a first sequence of samples and at least one pre-defined sequence, detect whether at least one first peak exists by a comparison of the correlation values with at least one first detection threshold, and if the at least one first peak exists, perform summing of at least a subset of the correlation values and detect at whether least one second peak exists by a comparison of the summed correlation values with a second detection threshold.

According to certain embodiments, a method may include determining correlation values between a first sequence of samples and at least one pre-defined sequence, detecting whether at least one first peak exists by comparing the correlation values with at least one first detection threshold, if the at least one first peak exists, the method may further include performing summing of at least a subset of the correlation values and detecting whether at least one second peak exists by comparing the summed correlation values with a second detection threshold.

According to certain embodiments, a computer program product, embodied on a non-transitory computer readable medium, may be configured to control a processor to perform a process, comprising determining correlation values between a first sequence of samples and at least one pre-defined sequence, detecting whether at least one first peak exists by comparing the correlation values with at least one first detection threshold, and if the at least one first peak exists, the process may also include performing summing of at least a subset of the correlation values and detecting whether at least one second peak exists by comparing the summed correlation values with a second detection threshold.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
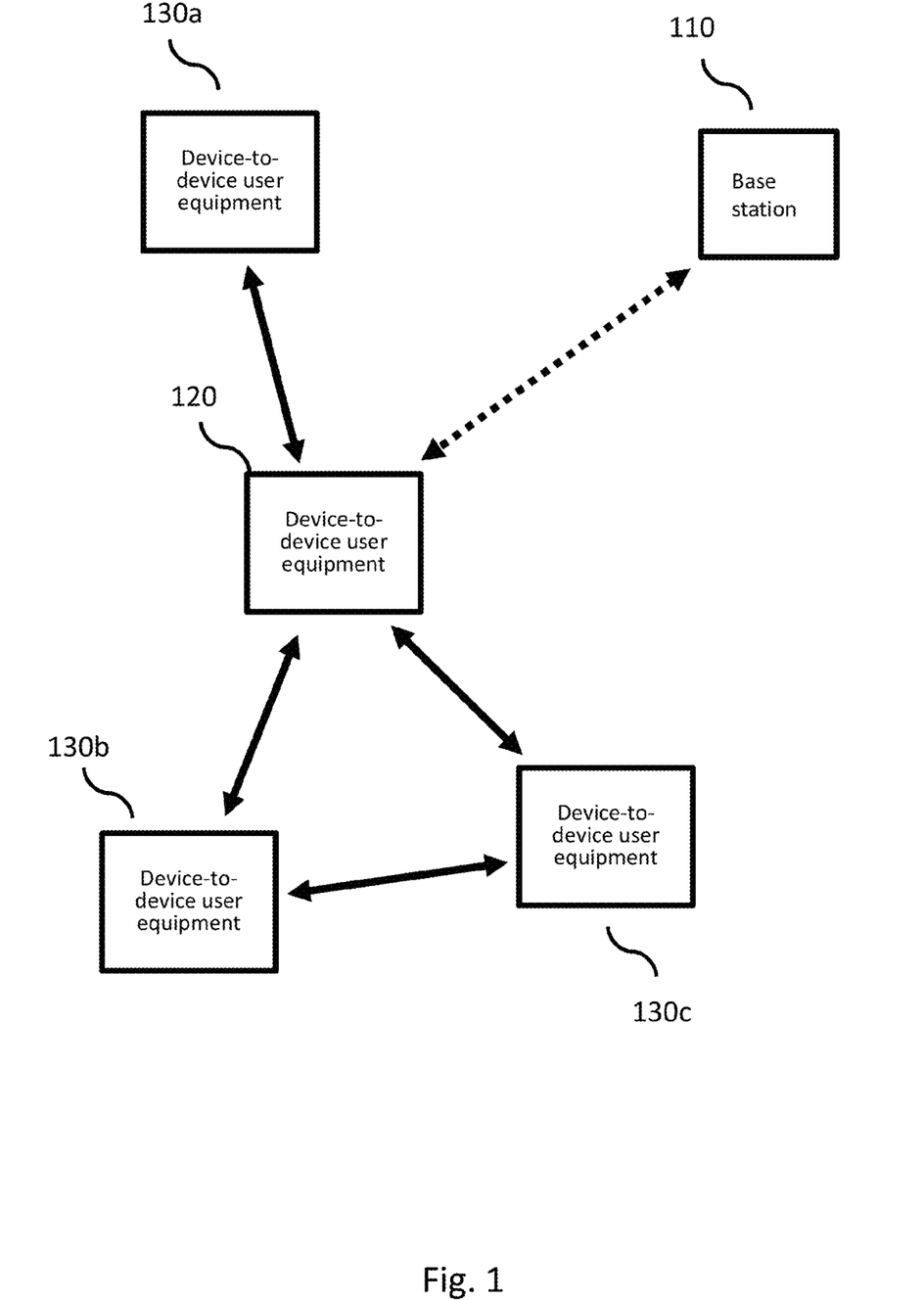
FIG. 1 illustrates an example of a network scenario according to some example embodiments of the invention.

FIG. 1 represents an example of a network scenario according to embodiments of the invention. In this example, the network comprises a base station, BS, (110) and multiple user equipments, UEs, (120, 130a, 130b, 130c). According to the example some, or all, of the UEs (120, 130a, 130b, 130c) may be able to communicate directly with the BS (110). In addition, or alternatively, in certain embodiments of the invention some, or all, of the UEs (120, 130a, 130b, 130c) may be capable of participating in D2D communications. Generally speaking, D2D communications may be defined as direct wireless communications between UEs (120, 130a, 130b, 130c). That is to say, in case of D2D communications transmissions may not necessarily traverse any intermediate node, such as the BS (110).

In an embodiment, a cell synchronization may be acquired first if a UE (120, 130a, 130b, 130c) desires to camp on a cell in LTE networks. After that the UE may determine a Physical Cell Identity, PCI. In addition the UE (120, 130a, 130b, 130c) may determine time and frame synchronization as well. The process may be performed as follows. The UE (120, 130a, 130b, 130c) may receive a signal from a BS (110) wherein the signal comprises a PSS. Once the UE (120, 130a, 130b, 130c) has found the PSS it may synchronize to the BS (110) on a subframe level.

The UE (120, 130a, 130b, 130c) may also look for a SSS. Generally speaking, in case of LTE systems the SSS may be found from the same subframe as the PSS. The UE (120, 130a, 130b, 130c) may then acquire a PCI group number from the SSS, and locate reference signals based, at least in part, on that. Reference signals may then be exploited for channel estimation, etc. In other systems broadly similar procedures are defined for causing a UE to camp in a cell. For example, in Wideband Code Division Multiple Access, WCDMA, networks an attach procedure is performed.

There is a similar concept in case of D2D communications, wherein PSSs and SSSs may be named as PD2DSSs and SD2DSSs, respectively. According to certain embodiments of the invention, a D2D UE (120, 130a, 130b, 130c) may receive the PD2DSS/SD2DSS from another D2D UE (120, 130a, 130b, 130c). Alternatively, or in addition, in some embodiments the PD2DSS/SD2DSS may be possibly received from the BS (110), an access point or any other device capable of wireless communication.

Figure 2:
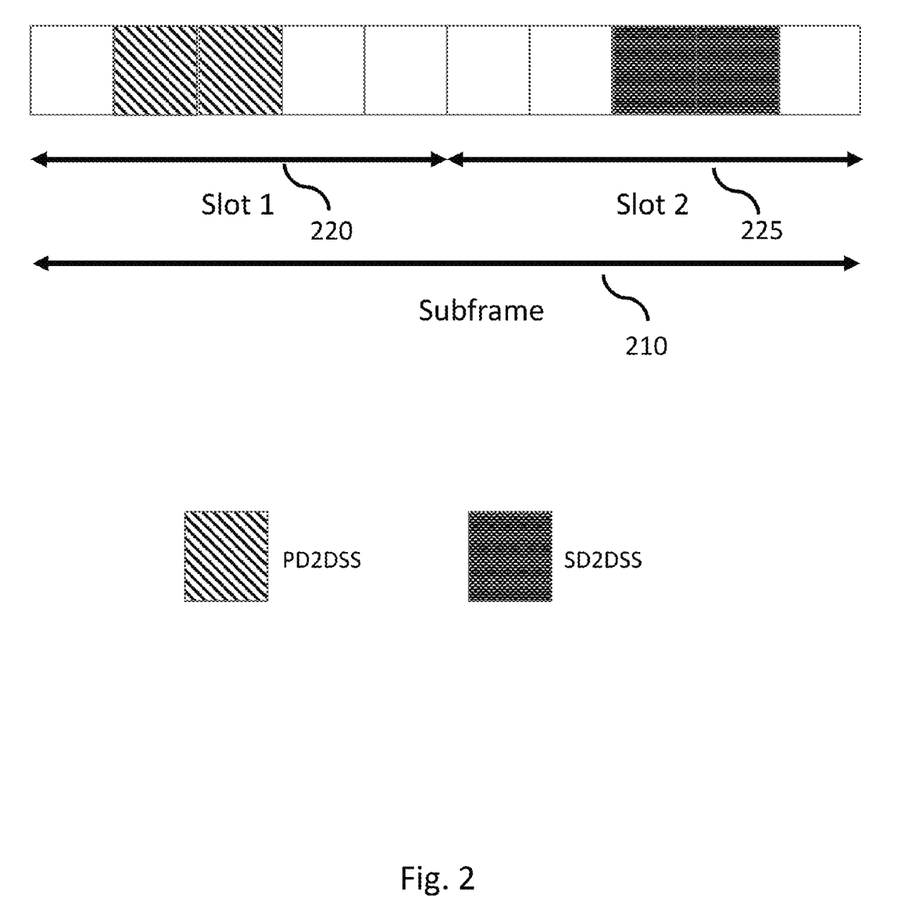
FIG. 2 illustrates an example of a D2D subframe, comprising PD2DSS and SD2DSS sequences of samples.

Turning now to FIG. 2, illustrated is an example of a D2D subframe (210), comprising PD2DSS and SD2DSS. According to the example of FIG. 2 the D2D subframe may comprise two slots, slot 1, 220 and slot 2, 225. However, in some embodiments there may be more than one subframe (210) and/or more than two slots (220, 225) in one subframe.

Also, PD2DSSs and SD2DSSs may possibly extend over several subcarriers. For example, in case of Orthogonal Frequency Division Multiplexing, OFDM, systems PD2DSSs and SD2DSSs may extend over several OFDM subcarriers so that PD2DSSs and PD2DSSs comprise one or more OFDM samples. Alternatively, or in addition, PD2DSSs and SD2DSSs may be within one Physical Resource Block, PRB, which comprises one or more subcarriers, or extend over several PRBs as well.

Referring to FIG. 2 again, a sequence of samples may correspond to the entire D2D subframe or a part of it. According to various embodiments of the invention the sequence of samples may refer to a PD2DSS, a SD2DSS or any other part of a subframe or a slot. In some embodiments PD2DSSs and SD2DSS may be OFDM symbols while the sequence of samples may refer to OFDM samples that correspond to the OFDM symbols. That is to say, the sequence of samples may be transmitted over several OFDM subcarriers. Nevertheless, the present invention is not restricted to any specific definition of the sequence of samples, that is, a person skilled in the art will understand how to apply the invention in different wireless systems that may have various subframe and slot configurations or different definitions of a sequence of samples.

In an embodiment, synchronization is performed by exploiting at least one pre-defined sequence. In some embodiments the at least one pre-defined sequence may be specified in a standard. As an example, the standard may be a 3GPP standard or any other wireless communication standard, such as Wireless Local Area Network, WLAN, and Worldwide Interoperability for Microwave Access, WiMAX, standard families. Examples of the at least one pre-defined sequence include, but are not limited to, PSSs, SSSs, PD2DSSs and SD2DSSs.

A receiver may not know the positions of PD2DSSs and SD2DSSs. However, a distance between two PD2DSSs may be predetermined, for example, by a 3GPP standard or any other wireless communication standard, such as WLAN and WiMAX standard families. In some embodiments the predetermined distance may be a distance between two sequences of samples in a subframe. For example, the predetermined distance may be defined as a number of symbols or samples between two PD2DSSs and/or SD2DSSs. Certain embodiments of the invention exploit this observation to provide an accurate detection method for LTE and D2D synchronization in the 3GPP LTE framework. Nevertheless, the embodiments of the invention are not limited to LTE and hence, the invention may be utilized in other wireless systems and networks as well, such as, for example, in WCDMA, WLAN or WiMAX networks.

The following provides examples of how this could be achieved in a wireless network. A receiver may first determine correlation values between a first sequence of samples and at least one pre-defined sequence. After that, the receiver may detect whether at least one first peak exists by a comparison of the correlation values with at least one first detection threshold. Responsive to detection of the at least one first peak, the receiver may perform summing of at least a subset of the correlation values with at least one first detection threshold and detect whether at least one second peak exists by a comparison of the summed correlation values with a second detection threshold.

In the context of D2D communications, a D2D UE may first determine correlation values between an OFDM symbol, possibly comprising multiple OFDM samples, and at least one PD2DSS. After that, the D2D UE may detect whether at least one first peak exists by a comparison of the correlation values with at least one first detection threshold. Responsive to detection of the at least one first peak, the receiver may perform summing of at least a subset of the correlation values with at least one first detection threshold and detect whether at least one second peak exists by a comparison of the summed correlation values with a second detection threshold.

Figure 3:
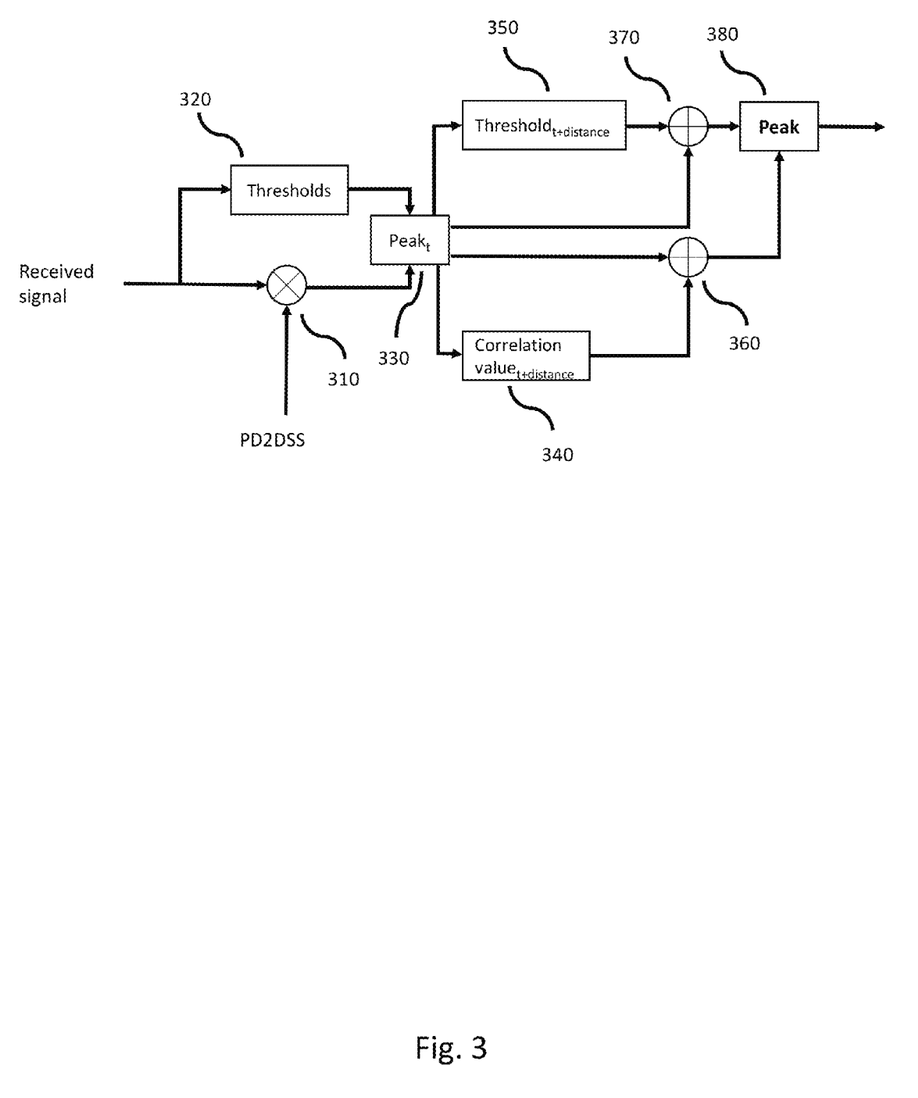
FIG. 3 illustrates a block diagram in accordance with at least some embodiments of the invention.

FIG. 3 depicts a block diagram of a process in accordance with at least some embodiments of the invention. The phases of the illustrated method may be performed by a D2D UE, for example, or a control device that is configured to control the functioning of a D2D UE when implanted therein. In the beginning of the process, a D2D UE may first receive a signal. The received signal may comprise a first sequence of samples and, potentially, a second sequence of samples as well. After reception of the signal, the D2D UE may process it as follows.

Referring to block 310 in FIG. 3, the received signal, comprising at least one first sequence of samples, may be correlated with at least one pre-defined sequence to determine correlation values. In some embodiments the at least one pre-defined sequence may comprise a PD2DSS. As an example, in certain cases there may be only one PD2DSS while in some other embodiments there may be two, three or even more PD2DSSs. Also, referring to block 320 of FIG. 3, the D2D UE may determine at least one first detection threshold for the at least one sequence of samples, for example, by calculating the autocorrelation of the received signal, or a part of it. In general, detection thresholds may be determined, for example, based on an energy of samples and/or desired probability of false alarm/detection.

Referring to block 330 in FIG. 3, the D2D UE may then detect whether at least one first peak exists. This may be done, for example, by comparing the correlation values with the at least one first detection threshold. In some embodiments the at least one first peak may exist if the correlation value is larger, or equal, compared to the at least one first detection threshold. It should be noted that it may be enough to detect one peak, although in some cases multiple peaks may be detected as well, depending on the situation in question.

In addition, the D2D UE may continue the process if the at least one first peak exists. Referring to block 340 of FIG. 3, the D2D UE may next find out a correlation value corresponding to a second sequence of samples, wherein said second sequence of samples is at a predetermined distance from the detected at least one first peak. Similarly, at block 350, the D2D UE may also find out a threshold corresponding to a second sequence of samples. In some embodiments the correlation value corresponding to the second sequence of samples need not exceed the corresponding threshold, but in some embodiments it may do so.

The predetermined distance may be defined or calculated, for example, as a number of symbols or samples between the at least one first peak and the second sequence of samples. In some embodiments the first and the second sequence of samples may be synchronization sequences, for example, PD2DSSs, that are comprised in a received signal. Nevertheless, it is also possible that the predetermined distance is defined, for example, in frequency.

Furthermore, referring to block 360 of FIG. 3, the process may be continued by performing summing of at least a subset of the correlation values. In certain embodiments, the subset of the correlation values may comprise a correlation value corresponding to at least one of the detected at least one first peak. In addition, the subset of the correlation values may comprise a correlation value corresponding to the second sequence of samples at the predetermined distance. Therefore, according to certain embodiments of the invention these two correlation values may be summed.

Similarly, the D2D UE may also sum more than two correlation values at different predetermined distances from the detected at least one first peak to the correlation value corresponding to the detected at least one first peak. Such different predetermined distances may depend, for example, on the periodicity of slots, subframes, etc. It should be noted that the embodiments of the invention are not restricted to any certain number of peaks or correlation values. Instead the embodiments of the invention may be exploited using more than two correlation values in the summing operation.

Referring to block 370 of FIG. 3, the D2D UE may also perform summing of detection thresholds. However, it is also possible to process detection thresholds by other means as well. According to certain embodiments of the invention, the detection thresholds to be summed are determined similarly as the correlation values to be summed in block 360 of FIG. 3. That is to say, the corresponding thresholds may be selected for summing as in case of block 360. So the D2D UE may perform summing of at least a subset of the detection thresholds as well and according to certain embodiments of the invention, the subset of the detection thresholds may comprise a detection threshold corresponding to at least one of the detected at least one first peak and, possibly, a detection threshold corresponding to the second sequence of samples at the predetermined distance. Evidently, more than two detection thresholds may be summed as well.

In some embodiments, summation of the detection thresholds may lead to a second detection threshold, wherein the second detection threshold may often be larger than the detection threshold corresponding to at least one of the detected at least one first peak. In certain embodiments the result of the summation may be used directly for further processing. Nevertheless, in some cases it may also be possible to use, for example, 95% or 105% of the summed thresholds so the embodiments of the invention are not restricted to precisely to the value of the summed thresholds in that sense.

Then, referring to block 380 of FIG. 3, the D2D UE may finally detect whether at least one second peak exists by exploiting the summed correlation values from block 360 and the second detection threshold from block 370. The at least one second peak is thereby detected by using the first peak and knowledge of the predetermined distance. According to certain embodiments of the invention, peak detection may be carried out in a similar manner as in block 330 of FIG. 3. Hence, the D2D UE may detect whether the at least one second peak exists by a comparison of the summed correlation values with the second detection threshold and if the summed correlation value is larger, or equal, compared to the second detection threshold, a second peak exists. Consequently, the D2D UE may determine that the locations of, for example, two PD2DSSs are the locations of the two highest peaks.

Figure 4:
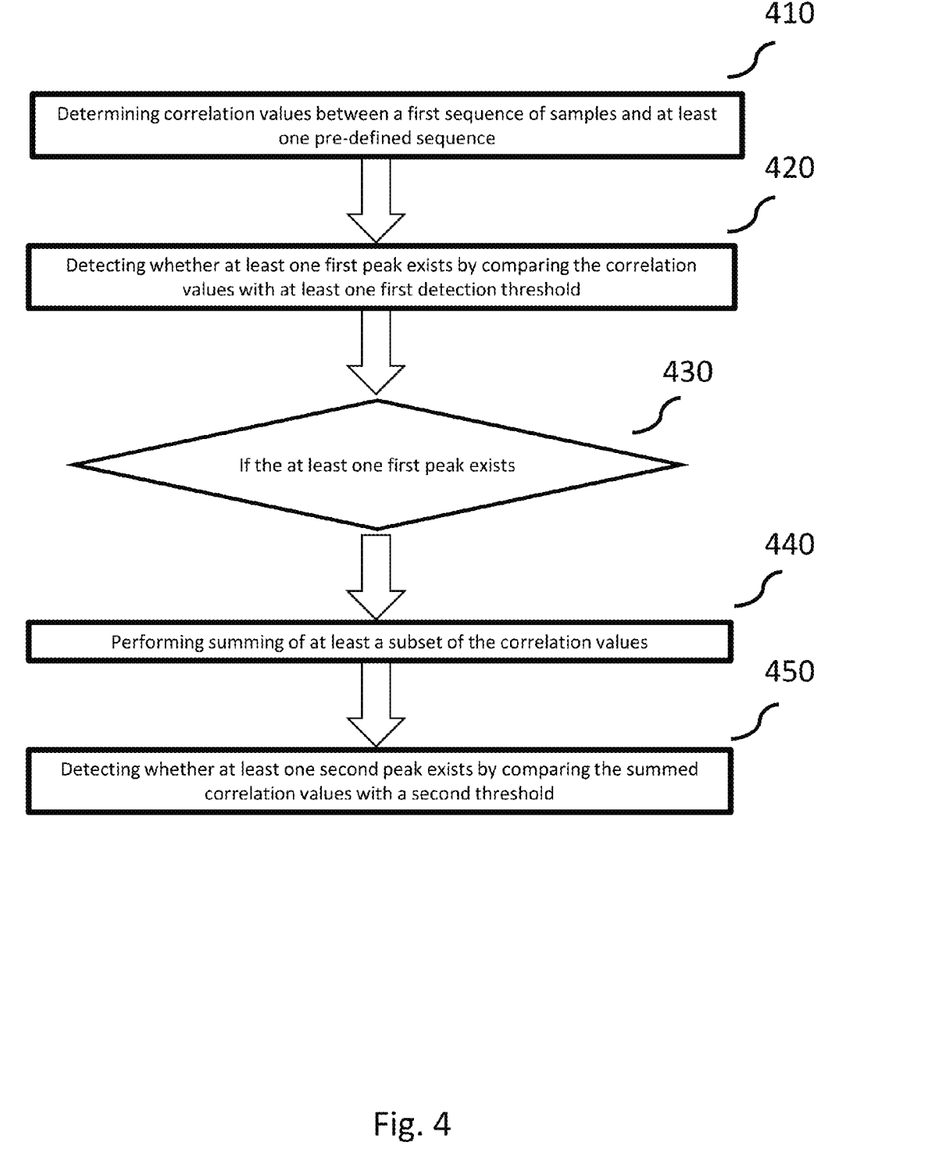
FIG. 4 illustrates a flowchart of a method in accordance with at least some embodiments of the invention.

Turning now to FIG. 4, which demonstrates a method according to at least some embodiments, the method may include, for example, receiving by a first D2D UE a signal from a second D2D UE. The received signal may be a D2D time-domain signal, and it may comprise a first and possibly a second sequence of samples. As shown in FIG. 4, the method may include, at 410, determining correlation values between the first sequence of samples and at least one pre-defined sequence, wherein the at least one pre-defined sequence may be a primary device-to-device synchronization signal, PD2DSS.

The method may also include, at 420, detecting whether at least one first peak exists by comparing the correlation value with at least one first detection threshold. In some embodiments the at least one first peak may exist if the correlation value is larger, or equal, compared to the at least one first detection threshold.

Responsive to detection of the at least one first peak, the method may proceed, at 430, if the at least one first peak exists. On the other hand, responsive to non-detection of the at least one first peak, the method may be terminated if the at least one first peak does not exist. It should be noted that with normal detection methods the process is terminated at this point regardless of whether the at least one first peak exists or not. However, according to at least some embodiments of the invention, the method may proceed to 440 responsive to detection of the at least one first peak.

At 440, the method may include performing summing of at least a subset of the correlation values. The subset of the correlation values may comprise a correlation value corresponding to the at least one of the detected at least one first peak. Also, the subset of the correlation values may comprise a correlation value corresponding to at least one second sequence of samples and, in some embodiments, the at least one second sequence of samples may be at a predetermined distance from the detected at least one first peak. Additionally, the predetermined distance may correspond to a distance between the first and the second sequences of samples.

The method may also include, at 450, detecting whether at least one second peak exists by comparing the summed correlation values with a second threshold. In one embodiment, the method may further include determining the second detection threshold by performing summing of at least a subset of detection thresholds. Moreover, the subset of detection thresholds may comprise a third detection threshold corresponding to at least one second sequence of samples at the predetermined distance from the detected at least one first peak. In such cases the predetermined distance may also correspond to a distance between the first and the second sequences of samples. Finally, the method may include identifying the primary device-to-device synchronization sequence based on the detected at least one second peak. It should be noted that the location of the detected at least one first peak may be the same as the location of the detected at least second peak.

Figure 5:
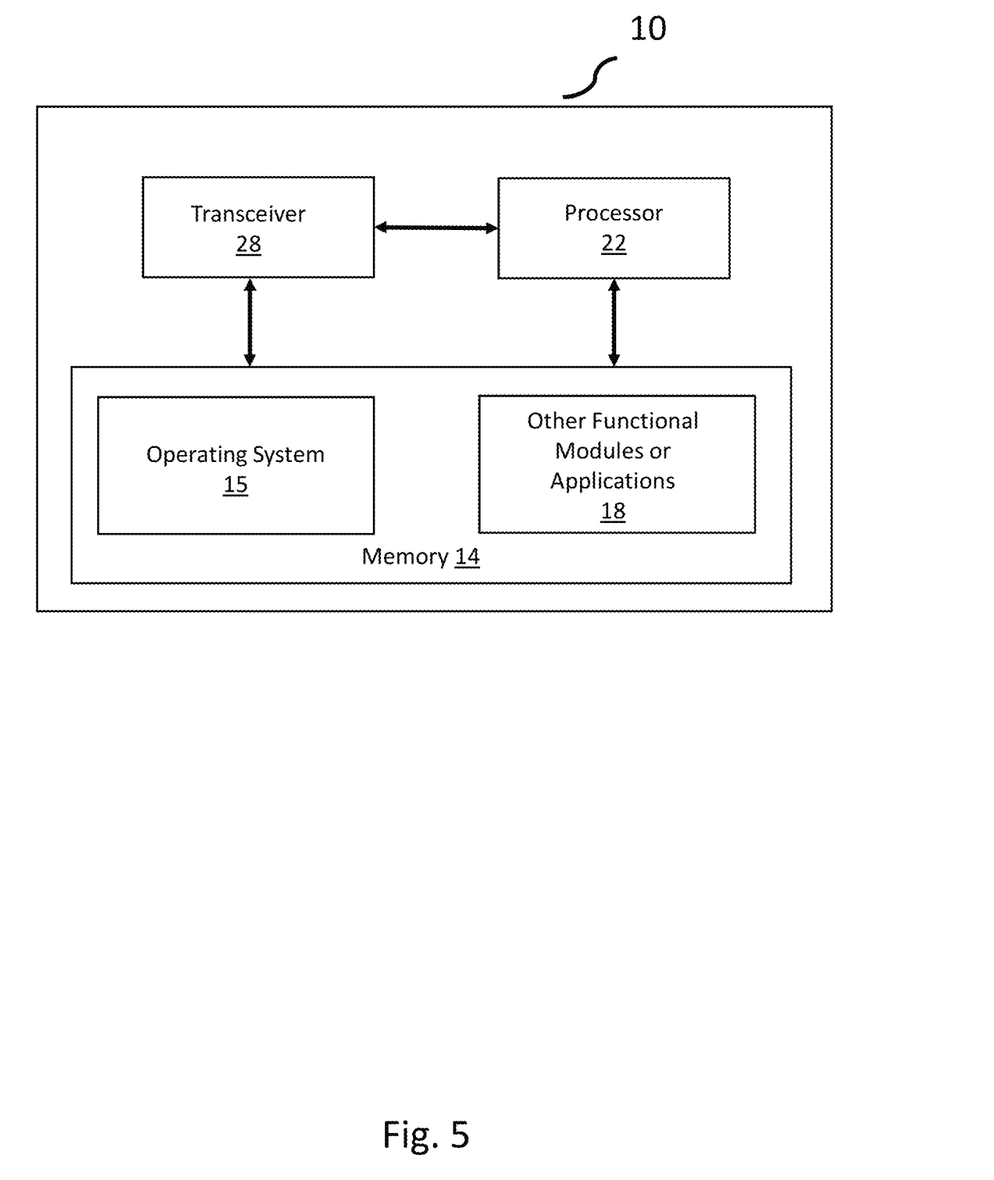
FIG. 5 illustrates an apparatus according to at least some embodiments of the invention.

FIG. 5 illustrates an apparatus 10 according to at least some embodiments of the invention. Apparatus 10 may be a wireless device, such as a user equipment or a device-to-device user equipment, for example.

The wireless device, user equipment or device-to-device user equipment may be a mobile station such as a mobile phone or smart phone or multimedia device, a computer, such as a tablet, provided with wireless communication capabilities, personal data or digital assistant, PDA, provided with wireless communication capabilities, portable media player, digital camera, pocket video camera, navigation unit provided with wireless communication capabilities or any combinations thereof, for example, the wireless device, user equipment or device-to-device user equipment may be a sensor or smart meter, or other device that may usually be configured for a single location. Additionally, the wireless device, user equipment or device-to-device user equipment may be a device suitable for machine-type-communications.

Apparatus 10 may comprise a processor 22 for processing information and executing instructions or operations. Processor 22 may be any type of suitable general or specific purpose processor. For example, processor 22 may comprise a Qualcomm Snapdragon or Intel Atom processor. Processor 22 may comprise at least one processing core, such as for example an Advanced Micro Devices, AMD, Steamroller or NVIDIA Denver core. While a single processor 22 is shown in FIG. 5, multiple processors may be utilized according to other embodiments. Processor 22 may comprise one or more of general-purpose computers, special purpose computers, microprocessors, digital signal processors, DSPs, field-programmable gate arrays, FPGAs, application-specific integrated circuits, ASICs, and processors based on a multi-core processor architecture, as examples.

Apparatus 10 may further comprise a memory 14, coupled to processor 22, for storing information and instructions that may be executed by processor 22. Memory 14 may comprise one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory, RAM, read only memory, ROM, static storage such as a magnetic or optical disk, or any other type of non-transitory machine or computer readable media. The instructions stored in memory 14 may comprise program instructions or computer program code that, when executed by processor 22, enable the apparatus 10 to perform tasks as described herein. Memory 14 may be at least in part comprised in processor 22.

Apparatus 10 may also comprise one or more antennas (not shown) for transmitting and receiving signals and/or data to and from apparatus 10. Apparatus 10 may further comprise a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources. Processor 22 may comprise a receiver and/or transmitter configured to enable processor 22 to communicate with other components of apparatus 10, such as, for example, memory 14.

In an embodiment, memory 14 stores software modules that provide functionality when executed by processor 22. The modules may comprise an operating system 15 that provides operating system functionality for apparatus 10. The memory may store one or more functional modules 18, such as an application or program, to provide additional functionality for apparatus 10. The components of apparatus 10 may be implemented in hardware, or as any suitable combination of hardware and software.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Moreover, one having ordinary skill in the art will readily understand that the invention as discussed above may be practiced in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an exemplary embodiment, an apparatus, such as a user equipment or a D2D UE, may include means for carrying out embodiments described above and any combination thereof.

We claim:

1. An apparatus, comprising:
   at least one processor; and
   at least one memory including computer program code,
   the at least one memory and the computer program code configured, with the at least one processor, to cause the apparatus at least to
   receive, from a device in a wireless communication system, a signal comprising a first sequence of samples, wherein the signal is a device-to-device time-domain signal;
   determine correlation values between the first sequence of samples and at least one pre-defined sequence;
   detect whether at least one first peak exists by a comparison of the correlation values with at least one first detection threshold;
   if the at least one first peak exists,
   perform summing of at least a subset of the correlation values; and
   detect whether at least one second peak exists by a comparison of the summed correlation values with a second detection threshold; and
   identify a primary device-to-device synchronization sequence based on the detected at least one second peak to be used for wireless communication between the apparatus and the device.

2. The apparatus according to claim 1, wherein the subset of the correlation values comprises a correlation value corresponding to at least one of the detected at least one first peak.

3. The apparatus according to claim 1, wherein the at least one memory and the computer program code are configured, with the at least one processor, to cause the apparatus at least to
   determine the second detection threshold by performing summing of at least a subset of detection thresholds.

4. The apparatus according to claim 3, wherein the subset of detection thresholds comprises a detection threshold corresponding to at least one of the detected at least one first peak.

5. The apparatus according to claim 3, wherein the subset of detection thresholds comprises a third detection threshold corresponding to at least one second sequence of samples at a predetermined distance from the detected at least one first peak.

6. The apparatus according to claim 1, wherein the subset of the correlation values comprises a correlation value corresponding to at least one second sequence of samples at a predetermined distance from the detected at least one first peak.

7. The apparatus according to claim 6, wherein the predetermined distance corresponds to a distance between the first and the second sequence of samples.

8. The apparatus according to claim 1, wherein the at least one memory and the computer program code are configured, with the at least one processor, to cause the apparatus at least to receive a signal comprising a second sequence of samples.

9. The apparatus according to claim 1, wherein the at least one pre-defined sequence comprises a primary device-to-device synchronization sequence.

10. The apparatus according to claim 1, wherein the apparatus is a user equipment configured to participate in a device-to-device communication.

11. The apparatus according to claim 10, wherein the device-to-device communication comprises direct wireless communication between user equipments that does not traverse any intermediate node.

12. A method, comprising:

receiving, by an apparatus from a device in a wireless communication system, a signal comprising a first sequence of samples, wherein the signal is a device-to-device time-domain signal;

determining correlation values between the first sequence of samples and at least one pre-defined sequence;

detecting whether at least one first peak exists by comparing the correlation values with at least one first detection threshold;

if the at least one first peak exists, performing summing of at least a subset of the correlation values; and detecting whether at least one second peak exists by comparing the summed correlation values with a second detection threshold; and identifying a primary device-to-device synchronization sequence based on the detected at least one second peak to be used for wireless communication between the apparatus and the device.

13. The method according to claim 12, wherein the subset of the correlation values comprises a correlation value corresponding to at least one of the detected at least one first peak.

14. The method according to claim 12, further comprising determining the second detection threshold by performing summing of at least a subset of detection thresholds.

15. The method according to claim 14, wherein the subset of detection thresholds comprises a detection threshold corresponding to at least one of the detected at least one first peak.

16. The method according to claim 14, wherein the subset of detection thresholds comprises a third detection threshold corresponding to at least one second sequence of samples at a predetermined distance from the detected at least one first peak.

17. The method according to claim 12, wherein the subset of the correlation values comprises a correlation value corresponding to at least one second sequence of samples at a predetermined distance from the detected at least one first peak.

18. The method according to claim 17, wherein the predetermined distance corresponds to a distance between the first and the second sequence of samples.

19. A computer program product, embodied on a non-transitory computer readable medium, wherein the computer program product is configured to control a processor to perform a process comprising:

receiving, by an apparatus from a device in a wireless communication system, a signal comprising a first sequence of samples, wherein the signal is a device-to-device time-domain signal;

determining correlation values between the first sequence of samples and at least one pre-defined sequence;

detecting whether at least one first peak exists by comparing the correlation values with at least one first detection threshold;

if the at least one first peak exists, performing summing of at least a subset of the correlation values; and detecting whether at least one second peak exists by comparing the summed correlation values with a second detection threshold; and identifying a primary device-to-device synchronization sequence based on the detected at least one second peak to be used for wireless communication between the apparatus and the device.

* * * * *